(12) United States Patent
Pilkington et al.

(10) Patent No.: US 10,887,335 B2
(45) Date of Patent: Jan. 5, 2021

(54) AGGREGATION OF RISK SCORES ACROSS AD-HOC ENTITY POPULATIONS

(71) Applicant: INTERSET SOFTWARE, INC., Santa Clara, CA (US)

(72) Inventors: Shaun Pilkington, Ottawa (CA); Michael John Cyze, Kincardine (CA); Stephan F. Jou, Richmond Hill (CA)

(73) Assignee: Interset Software, Inc., Santa Clara, CA (US)

( * ) Notice: Subject to any disclaimer, the term of this patent is extended or adjusted under 35 U.S.C. 154(b) by 222 days.

(21) Appl. No.: 16/041,090

(22) Filed: Jul. 20, 2018

(65) Prior Publication Data

US 2019/0044969 A1 Feb. 7, 2019

Related U.S. Application Data

(60) Provisional application No. 62/540,752, filed on Aug. 3, 2017.

(51) Int. Cl.
*H04L 29/06* (2006.01)
*G06F 8/61* (2018.01)

(52) U.S. Cl.
CPC ...... *H04L 63/1433* (2013.01); *H04L 63/1425* (2013.01); *G06F 8/61* (2013.01)

(58) Field of Classification Search
CPC ........ G06F 21/50; G06F 21/55; G06F 21/552; H04L 63/10; H04L 63/102; H04L 63/104; H04L 63/108; H04L 63/14; H04L 63/1433; H04L 63/20
See application file for complete search history.

(56) References Cited

U.S. PATENT DOCUMENTS

2014/0279641 A1 * 9/2014 Singh .................. G06Q 50/265
705/325

* cited by examiner

*Primary Examiner* — Edward Zee (57) ABSTRACT

The systems and methods described herein, given a population of entities each with associated information technology (IT) security risk scores, computes an aggregate risk score which quantifies the overall risk of the population. The method works for any arbitrary population of any size, and of any combination of different entity types and results in normalized risk scores for the arbitrary population (i.e. in the [0,1] range, regardless of population size or makeup). Since the risk scores are normalized, it affords comparison across different arbitrary entity populations having different combinations of entity types (e.g. users, servers, and printers). The aggregation technique allows for sensitivity to small numbers of high risk entities, which is a highly desirable characteristic for risk-based applications, and allows for sensitivity to different entity types or other relevant factors such as higher risk users, different threat types.

31 Claims, 6 Drawing Sheets

AGGREGATION OF RISK SCORES ACROSS AD-HOC ENTITY POPULATIONS

RELATED APPLICATION

The current application claims priority to U.S. provisional patent application 62/540,752 filed Aug. 3, 2017, which is incorporated herein by reference in its entirety.

TECHNICAL FIELD

The current disclosure is directed to systems and methods for effectively determining risk scores across arbitrary entity populations in an organization.

BACKGROUND

Cybersecurity solutions, as well as other solutions, often associate individual entities such as users, machines, files, servers, and other entities with an individual numerical risk score. For example, each entity may be associated with a numerical risk score between 0 and 100, or any scale desired, at any given point in time. The higher the risk score, the more suspicious that entity should be viewed as a possible security threat to the organization.

For solutions that display a per-entity risk score, it is useful to display an aggregated and normalized risk score that corresponds to a population of entities, potentially of different entity types, rather than a single entity at a time. For example it may be desirable to compare aggregated risk scores for an organization's employees located at each of the organization's different campuses. As a further example it may be desirable to aggregate risk scores of all computers associated with the accounting department. As another further example, it may be desirable to aggregate risk scores of all employees and computers associated with an offshore office, to compare against local offices.

However, naïvely aggregating individual risk scores to produce an aggregate score using, for example, summation or averages has limitations. For example, summation methods would result in different aggregate score ranges for different population sizes (i.e. large populations would have a larger score range than small populations), making comparisons between populations of different sizes ineffective. Further, if the size of a population goes down, such as when employees leave the organization, the overall aggregate risk will go down, which is misleading. While the disadvantages of simple summation may be mitigated by averaging or normalizing the summations, such summation methods and averaging methods would allow a single or small number of high risk entities to be lost and "averaged out" among many medium or low risk entities, resulting in a loss of important information in the risk score. Further, averaging methods (and other naïve methods) would not contemplate differences in effective risk across different entity types, which would limit risk score comparisons to be performed only between groups of similar employees, for example comparing the threat risk posed by accounting employees against the threat risk posed by the human resources department. Further, methods that rely on fixed populations of grouping, such as by the organizational structure of the company, do not permit the ability to dynamically create arbitrary but useful groupings of the population and compare them and visualize their trends over time, such as grouping by threat type or demographic class.

An additional, alternative and or improved method of monitor and identify possible security risks in an organization is desirable.

BRIEF DESCRIPTION OF THE DRAWINGS

Embodiments are described herein with reference to the appended drawings, in which.

DETAILED DESCRIPTION

In accordance with the present disclosure, there is provided a system for identifying possible cybersecurity threats to an organization, the system comprising: an electronic data store storing a plurality of information technology (IT) security events generated within an organizational entity, wherein each IT security event comprises an event time, one or more entities, and metadata describing the respective IT security event; a population selection component for specifying a target risk population of a subset of organizational entities from the plurality of organizational entities; a category risk score component for generating a plurality of category risk scores, each of the category risk scores providing a risk score for each category of organizational entities in the target risk population by: generating individual risk scores for each individual organization entity of the target risk population; and generating entity-category risk scores by combining individual risk scores for organizational entities having a same entity type; a population risk score component for generating a population risk score for the target risk population by combining the plurality of entity-category risk scores; and an assessment component for determining if the population risk score or rate of change of the population risk score exceeds a threshold value.

In a further embodiment of the system, the assessment component generates a notification to identify that the threshold for the population risk score or rate of change of the population risk score has been exceeded.

In a further embodiment of the system, the notification is an SMS or email message.

In a further embodiment of the system, the notification generates an action at a data loss prevention (DLP) or other security system to disable the associated accounts or computing devices in the target risk population.

In a further embodiment of the system, the notification generates an action to install software on the computing devices associated with the target risk population to monitor activity on the devices.

In a further embodiment, the system further comprises a plurality of computing devices associated with the organization, each of the computing devices capable of capturing data associated with the plurality of IT security events.

In a further embodiment of the system, generating the individual risk scores for each individual organization entity of the target risk population comprises: determining one or more aggregate statistics for each individual organization entity; and weighting, combining and normalizing the one or more aggregate statistics for each individual organization entity to provide the individual risk score.

In a further embodiment of the system, the weighting, combining and normalizing of the one or more aggregate statistics are into a single entity category risk score.

In a further embodiment of the system, combining and normalizing the one or more aggregate statistics uses a root mean square (RMS) or a non-linear function of the one or more aggregate statistics.

In a further embodiment of the system, generating entity-category risk scores by combining individual risk scores for organizational entities having the same entity type comprises: weighting, combining and normalizing the individual risk scores to provide a single entity category risk score.

In a further embodiment of the system, the weighting of the individual risk scores provide a non-linear weighting.

In a further embodiment of the system, the weighting of one or more individual risk scores further includes an additional weighting specific to the individual organization entity.

In a further embodiment of the system, combining and normalizing the individual risk scores uses a root mean square of the weighted individual risk scores.

In a further embodiment of the system, generating the population risk score for the target risk population by combining the plurality of entity-type risk scores comprises: weighting, combining and normalizing the individual entity-type risk scores to provide the population risk score.

In a further embodiment of the system, the weighting of the individual entity-type risk scores provide a non-linear weighting with a greater weighting for high entity-type risk scores.

In a further embodiment of the system, combining and normalizing the individual entity-type risk scores uses a root mean square (RMS) or non-linear function of the weighted individual entity-type risk scores.

In accordance with the present disclosure there is further provided a method of identifying possible cybersecurity threats to an organization, the method comprising: receiving a plurality of information technology (IT) security events generated within an organizational entity, wherein each IT security event comprises an event time, one or more entities, and metadata describing the respective IT security event; selecting a target risk population of a subset of organizational entities from the plurality of organizational entities; generating a plurality of category risk scores, each of the category risk scores providing a risk score for each category of organizational entities in the target risk population by: generating individual risk scores for each individual organization entity of the target risk population; and generating entity-category risk scores by combining individual risk scores for organizational entities having a same entity type; generating a population risk score for the target risk population by combining the plurality of entity-category risk scores; and determining if the population risk score or rate of change of the population risk score exceeds a threshold value.

In a further embodiment, the method further comprises generating a notification to identify that the threshold for the population risk score or rate of change of the population risk score has been exceeded.

In a further embodiment of the method, the notification is an SMS or email message.

In a further embodiment of the method, the notification generates an action at a data loss prevention (DLP) or other security system to disable the associated accounts or computing devices in the target risk population.

In a further embodiment of the method, the notification generates an action to install software on the computing devices associated with the target risk population to monitor activity on the devices.

In a further embodiment of the method, generating the individual risk scores for each individual organization entity of the target risk population comprises: determining one or more aggregate statistics for each individual organization entity; and weighting, combining and normalizing the one or more aggregate statistics for each individual organization entity to provide the individual risk score.

In a further embodiment of the method, the weighting, combining and normalizing of the one or more aggregate statistics are into a single entity category risk score.

In a further embodiment of the method, combining and normalizing the one or more aggregate statistics uses a root mean square (RMS) or a non-linear function of the one or more aggregate statistics.

In a further embodiment of the method, generating entity-category risk scores by combining individual risk scores for organizational entities having the same entity type comprises: weighting, combining and normalizing the individual risk scores to provide a single entity category risk score.

In a further embodiment of the method, the weighting of the individual risk scores provide a non-linear weighting.

In a further embodiment of the method, the weighting of one or more individual risk scores further includes an additional weighting specific to the individual organization entity.

In a further embodiment of the method, combining and normalizing the individual risk scores uses a root mean square of the weighted individual risk scores.

In a further embodiment of the method, generating the population risk score for the target risk population by combining the plurality of entity-type risk scores comprises: weighting, combining and normalizing the individual entity-type risk scores to provide the population risk score.

In a further embodiment of the method, the weighting of the individual entity-type risk scores provide a non-linear weighting with a greater weighting for high entity-type risk scores.

In a further embodiment of the method, combining and normalizing the individual entity-type risk scores uses a root mean square (RMS) or non-linear function of the weighted individual entity-type risk scores.

Cybersecurity threats to an organization may include cyberattacks such as denial of service attacks, computer viruses, data theft, advanced persistent threats and insider threats. These attacks may be detected and mitigated using a variety of techniques including heuristics, signature analysis, and behavioral analytics. Other cybersecurity threats to an organization may relate to the loss or theft of internal research, theft of intellectual property, theft of confidential business information or other malicious behaviours, etc. These types of threats often involve a human element, either knowingly or unknowingly. In order to help security personnel investigate such possible security threats, the potential threat risks need to be identified and security personnel notified appropriately. As described further below, systems and methods that allow security personnel to compute aggregate risk scores for ad-hoc populations of entities having different compositions of entity types or categories, such as for example users or user accounts, computers, servers, directories, files, printers, access points, firewalls, etc. as well as different population sizes that can be compared across ad-hoc populations may help to identify and address possible security threats. Further, these systems and methods may also be used in determining the effectiveness of different security policies as they are applied to different groups.

The systems and methods described herein, given a population of entities each with associated risk scores, compute an aggregate risk score which quantifies the overall risk of the population. The implementation described herein has several advantages over other aggregation methods, such as taking a simple population average or a summation. The current technique works for any arbitrary population of any size, and of any combination of different entity types and results in normalized risk scores for the arbitrary population (i.e. in the [0,1] range, regardless of population size or makeup). Since the risk scores are normalized, it affords comparison across different arbitrary entity populations having different combinations of entity types (e.g. users, servers, and printers). The aggregation technique allows for sensitivity to small numbers of high risk entities, which is a highly desirable characteristic for risk-based applications, and allows for sensitivity to different entity types or other relevant factors such as higher risk entities (e.g. users on a watch list, repositories that contain critical data, machines in a deception network), or different threat types. The techniques provide for the dynamic and arbitrary, but still useful, groupings of different populations to compare different population risk scores, without limiting to a pre-defined structures such as the organization's departments. For example, one possible ad-hoc grouping may aggregate risk scores of all employees hired within the last six months, or all entities located on a particular floor of a building, etc. The technique may compare the risk contribution of different threat types, such as lateral movement, compromised account, suspicious activity, data staging, data exfiltration etc., to a population's risk score. The risk score for a population may be determined at different points in time in order to visualize trends in different population risk scores, without limiting to pre-defined structures (such as the organization). For example, you could visualize the change in risk scores across all employees, and see if a reduction in risk occurred after a new security education program was rolled out after a specific date.

A typical organization, such as a corporation or enterprise, can expect to have a large number of low risk users, with only a handful, possibly only 1 or 2, high risk users, or user accounts that have been compromised, and are actively engaging in nefarious activity. As a result, it is desirable that a small number of high risk entities not be lost among a large number of low risk entities. As a result, the aggregation function that is useful for computing a population's risk score should be more sensitive to higher entity risk scores than to lower entity risk scores. Additionally, it may be desirable for the aggregation function to be monotonic so that, as more entities with non-zero risk values are included in the population, the corresponding risk score should also increase by a non-zero amount. After experimentation with different statistical aggregation functions, the root mean square (RMS) algorithm was selected for the aggregation, however other aggregation functions may be used. An RMS may be used to compute the overall risk score for all entities within a given entity type. Also useful is a weighted average where the weight is a function of the descending order of rank (i.e. so the numerically largest risk score receives the greatest weight)

Further, the typical organization may suffer more potential damage from the effect of its users (either internal employees or employee accounts that have been taken over by an external attacker) than from most other entities, such as printers, VoIP telephones, etc. There are notable exceptions, however: for example, a server machine that contains a company's most valuable intellectual property if attacked or damaged may result in more damage than a single infected or compromised user account. As a result, the current aggregation technique utilizes a high weight for a user's intermediate risk score and low weights for weighting all the other entity types' intermediate risk scores. However, the current system provides the ability for the organization to increase the weight for specific named entities such as the valuable server machine with valuable intellectual property.

The current system for aggregating risk scores in ad-hoc populations allows security personnel to observe changes in the ad-hoc population risk score over time, as well as compare risk scores of two different and distinct non-overlapping populations A and B, where the entity types in the two populations are the same (e.g. compare risk scores of two different populations of users, or compare risk scores of two different populations of servers and printers). The population aggregation technique described herein is stable for a given set of entity types, but insensitive to differences in population size, so it can fairly compare a small group with a much larger group of the same entity types. In addition to comparing risk scores of two different populations having the same entity make-up, the ad-hoc population aggregation technique can also be used to calculate and compare risk scores of different entity types (e.g. compare the risk of VoIP devices against network printers). The ad-hoc populations may include organizational entities of a single type, such as users or user accounts, printers, servers, etc. or may include different types of the organizational entities.

As described further below, different entities of an organization may be selected, either automatically, manually, or according to a predefined grouping, for inclusion in a target population. Individual entity risk scores for each category of entity present in the population can be determined from an aggregation of the individual entity's risk score within each category. The aggregate risk scores for each category can then be combined.

Figure 1:
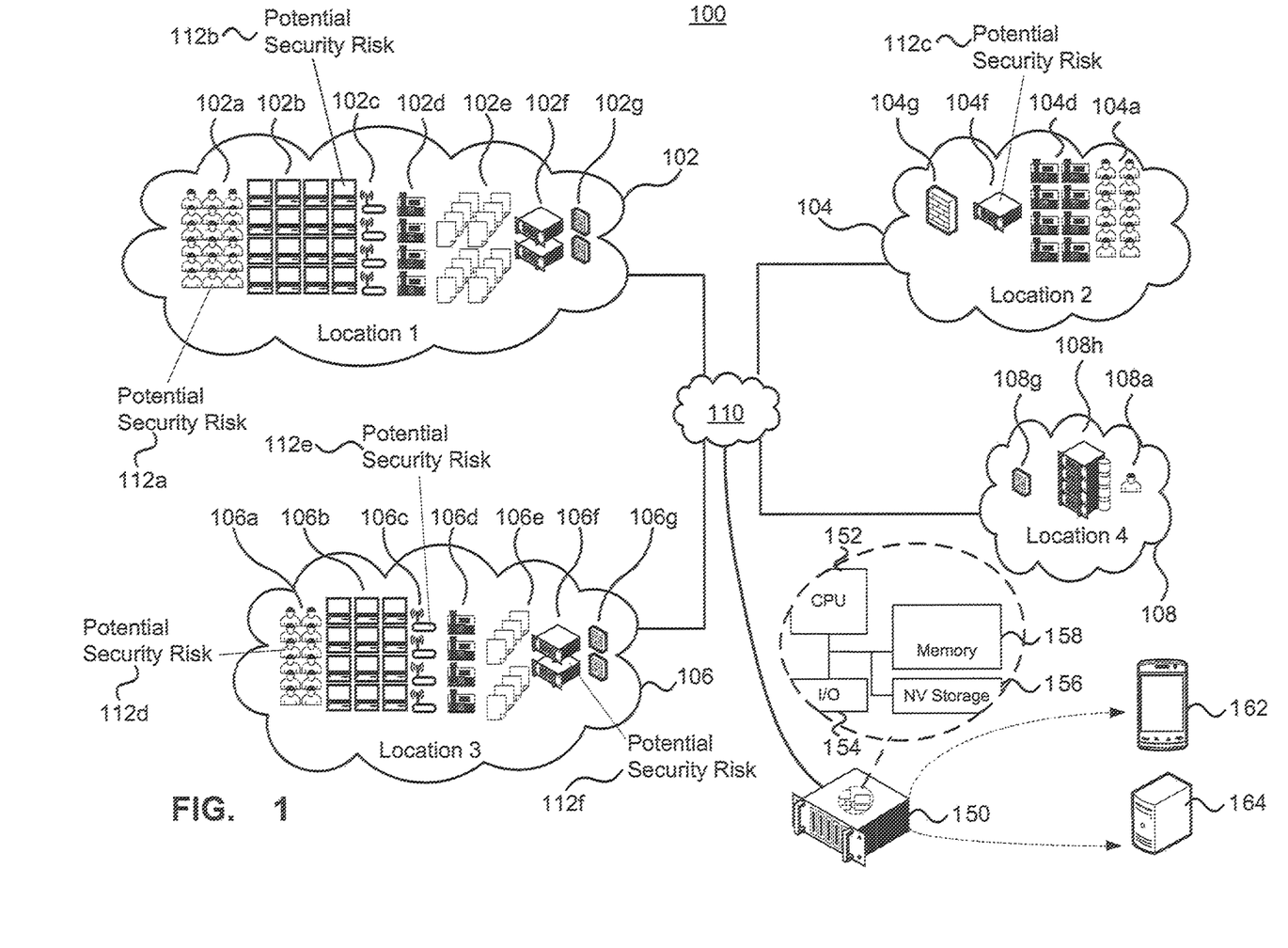
FIG. 1 depicts an arrangement of entities within an organization.

FIG. 1 depicts an arrangement of entities within an organization. An organization 100 may have a number of different physical locations 102, 104, 106, 108 with each location connected together by one or more network connections 110. Each location 102, 104, 106, 108 may have a number of employees along with associated equipment and resources. For example, location 1 102, which may be the organization's main office may have a number of employees 102a each of whom would be associated with a respective user account, a number of computers 102b, network infrastructure such as routers and access points 102c, VoIP telephones 102d, a number of documents and files 102e, a number of servers 102f and firewalls 102g. Location 2 104 of the organization may be for example a call center for the organization and as such may have mostly employees or user accounts 104a, VoIP telephones 104d, a server 104f and firewall 104g. The organization's third location 106 may be a secondary office and so may have a similar composition as the first location including a number of employees 106a, a number of computers 106b, network infrastructure such as routers and access points 106c, VoIP telephones 106d, a number of documents and files 106e, a number of servers 106f and firewalls 106g. The organization's fourth location may be a data warehouse and so may comprise a small number of employees 108a, a number of data servers 108h and firewall 108*g*. It will be appreciated that this particular organizational structure is only intended as an example and any number of organizational structures are possible, with different numbers and compositions of entities and different entity types. Each entity within an organization has an associated risk score determined from the information technology (IT) security event data. The risk score defines a risk that the entity, computing device, user account, user, presents a security risk in regards to data theft, malicious intent, data destructions or industrial espionage etc.

As depicted in FIG. 1, a number of individual entities may be a potential information technology (IT) security risk to the organization's security. The entities may pose a security risk for various reasons, such as being an infected, or potentially infected host computer, being an account of a disgruntled employee attempting to steal sensitive information, being a compromised account, etc. As depicted, the potential security risk entities may include one or more compromised users or user accounts 112*a*, 112*d*, a potentially compromised computer 112*b*, potentially compromised servers 112*c*, 112*f* and potentially compromised access point 112*e*. It will be appreciated that not all security risk entities are an equal threat. For example, a compromised user account 112*a* may be a larger security threat than a compromised access point 112*e*. Further, different entities within the same category may not pose an equal threat. For example, the compromised server 112*c* at a call center may not pose as great a threat as the compromised server 112*f* at the secondary office location 106.

The system is depicted as comprising a single server computing device 150;

however, as described in further detail below, the aggregation process may be easily scaled to, or distributed across, multiple servers. The server 150 is depicted as comprising a processing unit 152 capable of executing instructions. One or more input/output (I/O) interfaces 154 may be coupled to the processing unit 152. The I/O interface 154 may allow additional components to be connected to the processing unit.

The additional components may include a wide variety of components, including for example wired or wireless network interfaces, keyboards mice, touch sensitive devices, speakers, printers, displays, etc. The server 150 may further include non-volatile storage 156 as well as volatile storage such as memory unit 158, which may comprise for example random access memory. The memory unit 158 may store instructions, and data, which when executed by the processing unit 152 configure the server 150 to provide various functionality including the generation of risk scores across ad-hoc entity populations. The executed instructions may configure the one or more servers of the system to implement one or more of the data sources, data storage components, and/or data processing components described herein. The server 150 receives IT security event data from one or more sources within the organization, processes the data based upon to determine a risk score for the entity population. The server 150 can then perform an action based upon the generated risk score for the population exceeding a defined or determined threshold. For example a notification message may be sent to a mobile device 162 or computing device 164 advising of the risk threshold being exceeded via SMS, email, or an application programming interface (API). Additionally or alternatively actions may be performed by a data loss prevention (DLP) system or other security system to lock access to software to the population defined by the ad-hoc entity. Software may, additionally or alternatively, be deployed to the accounts or computing devices to monitor actions or behaviours on the computing devices or associated accounts, depending on the determined risk severity.

In order to identify potential security risks and so allow mitigation or remediation steps to be taken, it is desirable to provide security personnel with tools that allow them to easily and efficiently monitor and identify possible security risks. As described further below, by allowing different ad-hoc groups to be identified and risk scores determined, it is possible to identify potential security risks within the organization. The risk score for the identified ad-hoc groups may be periodically determined to allow for the monitoring of the potential security risk over time.

Figure 2:
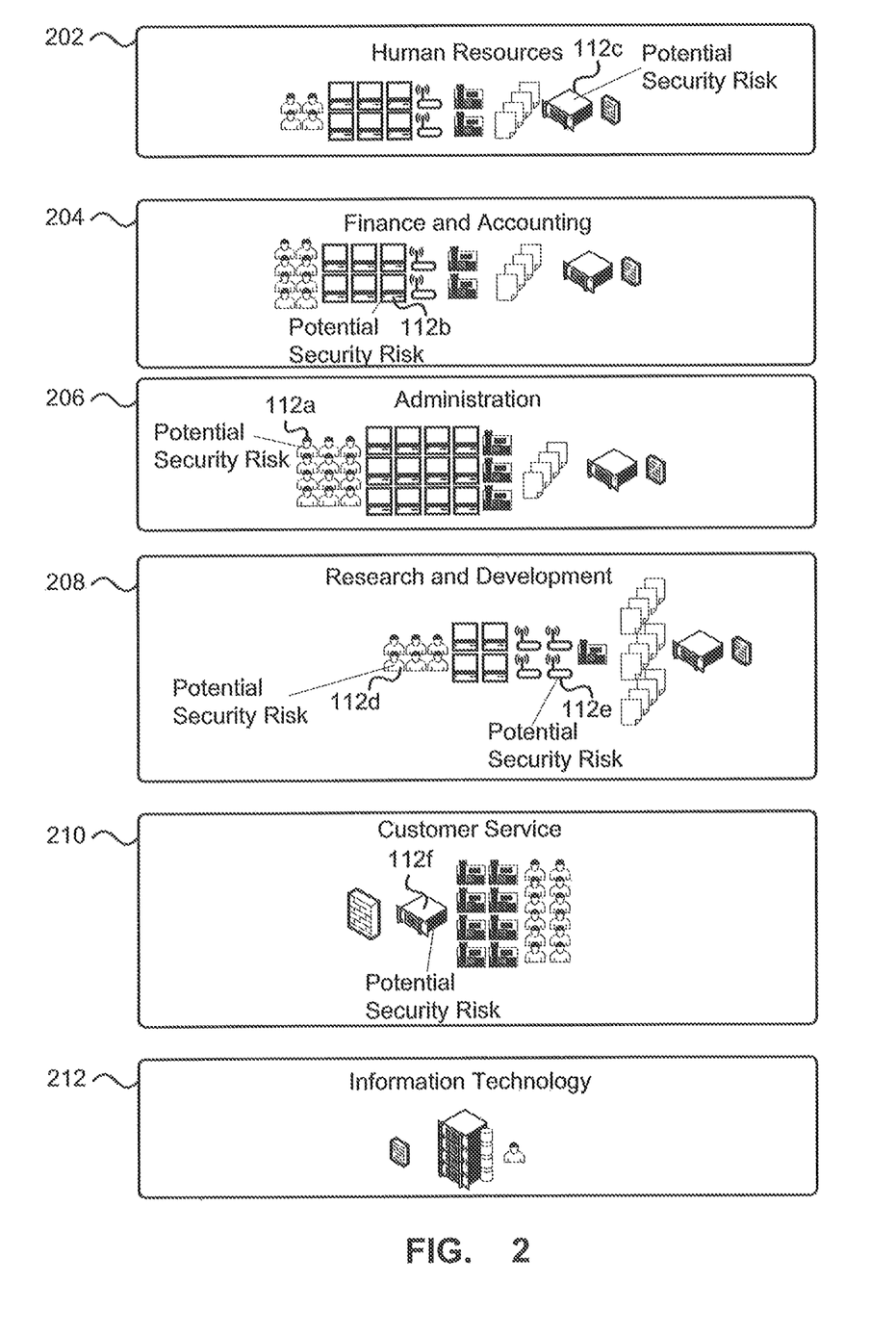
FIG. 2 depicts a grouping of the entities in the organization according to organizational departments.

FIG. 2 depicts a grouping of the entities in the organization along organizational departments. As depicted in FIG. 2 it is possible to group each entity of an organization into populations according to the organization's departments. For example, all of the entities for human resources may be grouped into a first population 202, all of the entities for finance and accounting may be grouped into a second population 204, all of the entities for administration may be grouped into a third population 206, all of the entities for research and development may be grouped into a fourth population 208, all of the entities for customer server may be grouped into a fifth population 210, and all of the entities for information technology may be grouped into a sixth population 212. While such groupings may be beneficial in certain scenarios, it may not help in identifying potential security threats. As depicted in FIG. 2 such grouping of entities does not provide any meaningful insights into the potentially compromised entities 112*a*-112*f*, which appear to be randomly distributed among departments.

Figure 3A:
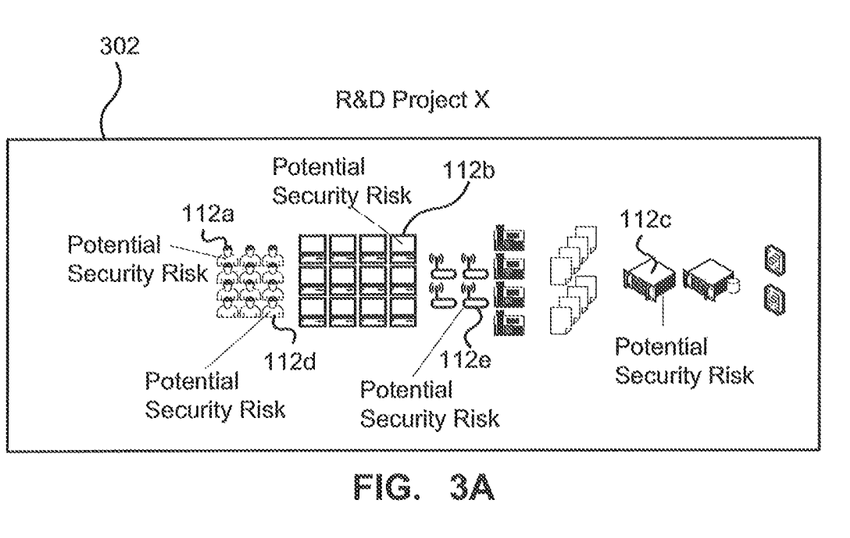
FIGS. 3A & 3B depict an ad-hoc grouping of the entities in the organization.

FIG. 3A depicts a first ad-hoc grouping of the entities in the organization. When an ad-hoc group is formed, for example, for the population of entities associated with an organization's research and development project 'X' 302 it may be possible for security personnel to identify a concerted attack to compromise the project. Accordingly, the risk score for the ad-hoc group of entities associated with the project 'X' 302 will be higher when compared to the risk score associated with other possibly less sensitive projects, or other ad-hoc groupings. Such information may be invaluable to security personnel in identifying potential security risks and taking steps to address them.

Figure 3B:
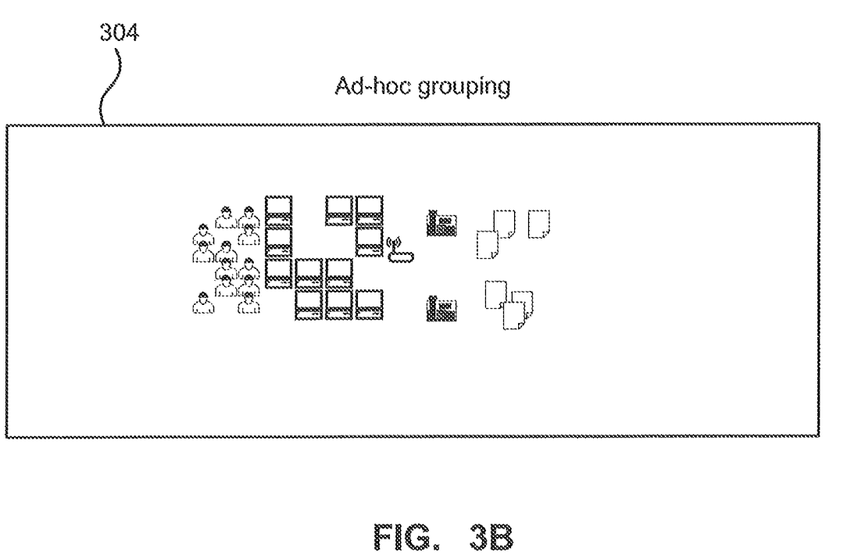

FIG. 3B depicts a second ad-hoc grouping of the entities in the organization. The ad-hoc grouping 304 may be created by selecting the entities for inclusion in the grouping. Entities may be specified individually, for example be specifying an identifier associated with the entity, (i.e. a user account ID, a MAC address or computer ID, etc.), or groups of entities. Additionally or alternatively, the entities may be specified by identifying a characteristic or characteristics of the entities to include such as all user accounts created associated with employees who have a security clearance, or all computers that can access the internet. Further still, while it is possible to specify entities to include in the ad-hoc group, it is also possible to specify entities to exclude in a similar manner. For example, the ad-hoc group may include all employees in accounting, but not those accounting employees have been employed with the organization for more than 10 years, all computers and access points on the accounting floor, and VoIP phones associated with accounting managers and all files of financial reports. It will be appreciated that the particular ad-hoc group described above is merely an example, and the particular entities to include in an ad-hoc group will depend upon particular organizations and what security personnel are looking for or considering. The tool or system and associated methods described herein allows security personnel to specify ad-hoc groupings and determine a risk score for the grouping that is meaningful for comparison across other groupings in the organization.

Figure 4:
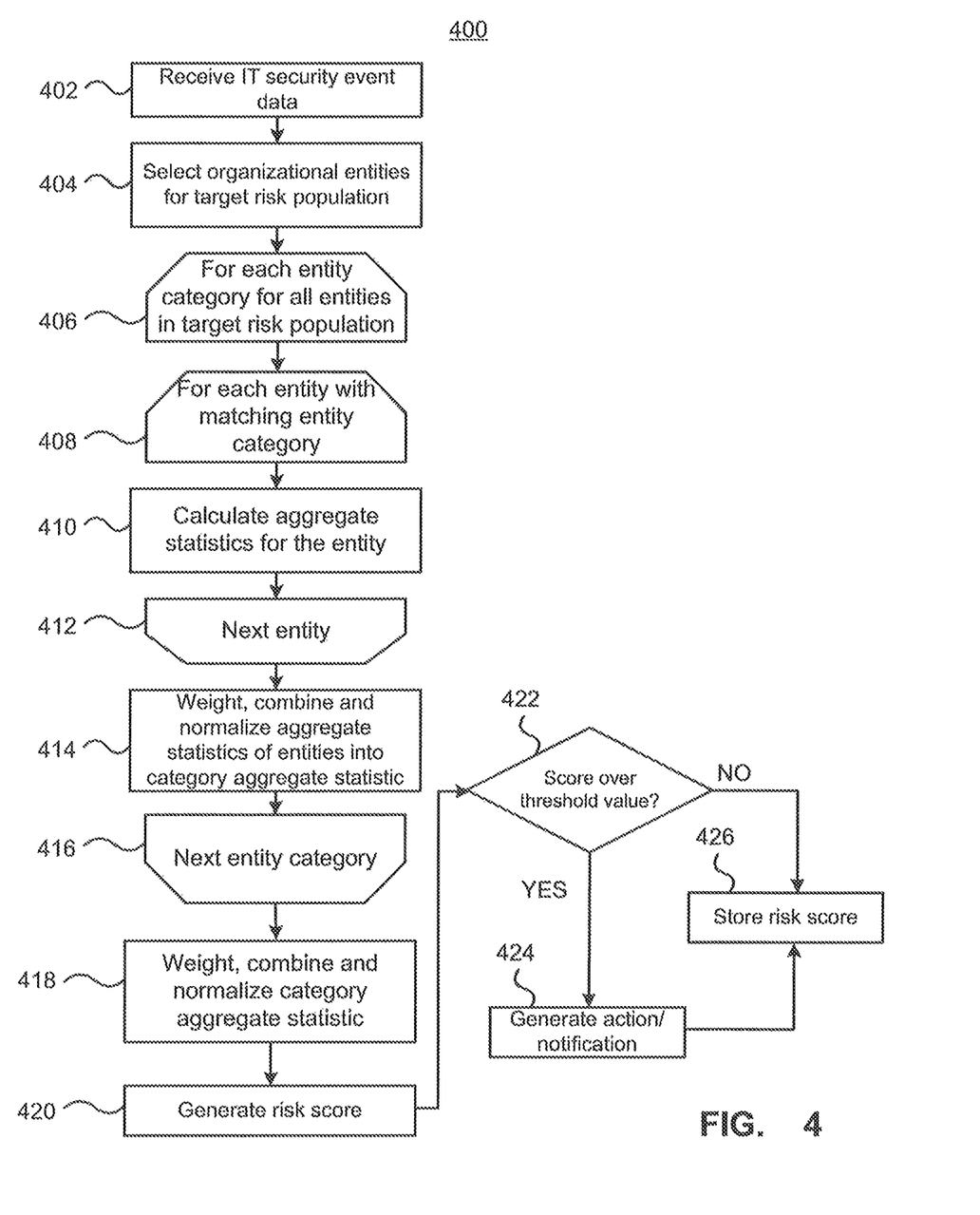
FIG. 4 depicts a method of determining a risk score for an ad-hoc population of entities.

FIG. 4 depicts a method of determining a risk score for an ad-hoc population of entities. The method 400 allows risk scores for different populations of entities to be determined and compared, even if the entity composition of the populations differs. The method 400 receives security event data (402) from across an organization. The security event data may comprise information on different entities such as user account activity (i.e. successful login attempts, unsuccessful login attempts, login times, login locations, etc., resources accessed, amount of data retrieved, amount of data copied, etc.) device information such as virus scan results, security audit results, network data such as NetFlow data, as well as other events that occur within the organization and may be relevant to determining a security threat. A number of organizational entities are selected for inclusion in a target risk population (404). The entities may be selected individually by a security personnel or may be selected based on some particular criteria, such as all entities that are associated with a particular project, all new entities, or any other arbitrary grouping of entities. It will be appreciated that the particular grouping of entities that can provide meaningful comparison's will depend upon the particular organization and would be apparent to those of ordinary skill within the organization in the art having regard to the current teachings. Once the target risk population is defined, each entity category in the target risk population is processed (406). For example, in FIG. 3 the entity categories present in the population 302 for project 'X' include user accounts, computers, access points, VoIP phones, files, servers and firewalls. When processing each entity category, each entity within the category (408) is processed. Aggregate statistics for each entity within a category are calculated (410). The aggregate statistics may differ for different entity categories, for example for user accounts, a number of different aggregate statistics for each entity may be calculated such as providing an indication of probabilities of respective threat types including potential lateral movement, potential compromised account, etc. For each entity within the category, the individual aggregate statistics for the different threats are determined and the next entity (412) retrieved and processed. Once the aggregate statistics for each entity in a category have been determined they are weighted, combined and normalized into a category aggregate statistic (414) and the next entity category can be processed (416). The weighting of the aggregate statistics may be used to adjust a relative importance of one or more of the aggregate statistics. Further, the weighting does not need to be a single weighting value and may provide a higher weighting for higher values of aggregate statistics. Such a weighting assumes that, for example one high risk aggregate statistic of 0.9 and three low risk aggregate statistics of 0.1 is a larger risk than four aggregate statistics of 0.5. The combining and normalization of the weighted aggregate risk scores may be done using a root mean square or other averaging techniques. Once the category aggregate statistics are determined for each category in the selected population, the category aggregate statistics are weighted, combined and normalized to a category aggregate statistic (418). The category weightings may be similar to the weightings described above in that the weightings do not need to be a single value and can provide greater sensitivity to entities with high risk scores. Further, it is possible to increase the particular weighting of particular individual weightings. For example, a weighting for a specific entity such as a highly valuable server, or an administrator account may be specified with an increased weighting compared to other entities of the same type. Additionally or alternatively different statistical aggregation functions may be applied to data such as for example RMS or non-linear weighting functions. The aggregate risk score represents a security risk the particular selected population presents to the organization (420). The aggregate risk scores can be compared across populations regardless of the population composition or to a risk threshold. The value of the risk score can be compared to a threshold value, for example 50%, (YES at 422) to enable an action and/or notification to occur (424). The notification may for example be provided by an SMS, e-mail or API message to notify a responsible party or system that a risk threshold value has been exceeded. Additionally or alternatively an action may be performed to the accounts or computing devices associated with the entity grouping to monitor or mitigate further data loss. The generated risk score is stored (426) for further processing or display. The type of notification or action performed may be associated with a threat type associated with the risk. For example data theft may result in access to a document management system being remove whereas malware may result in a disconnection or disabling of a device from the network.

Figure 5:
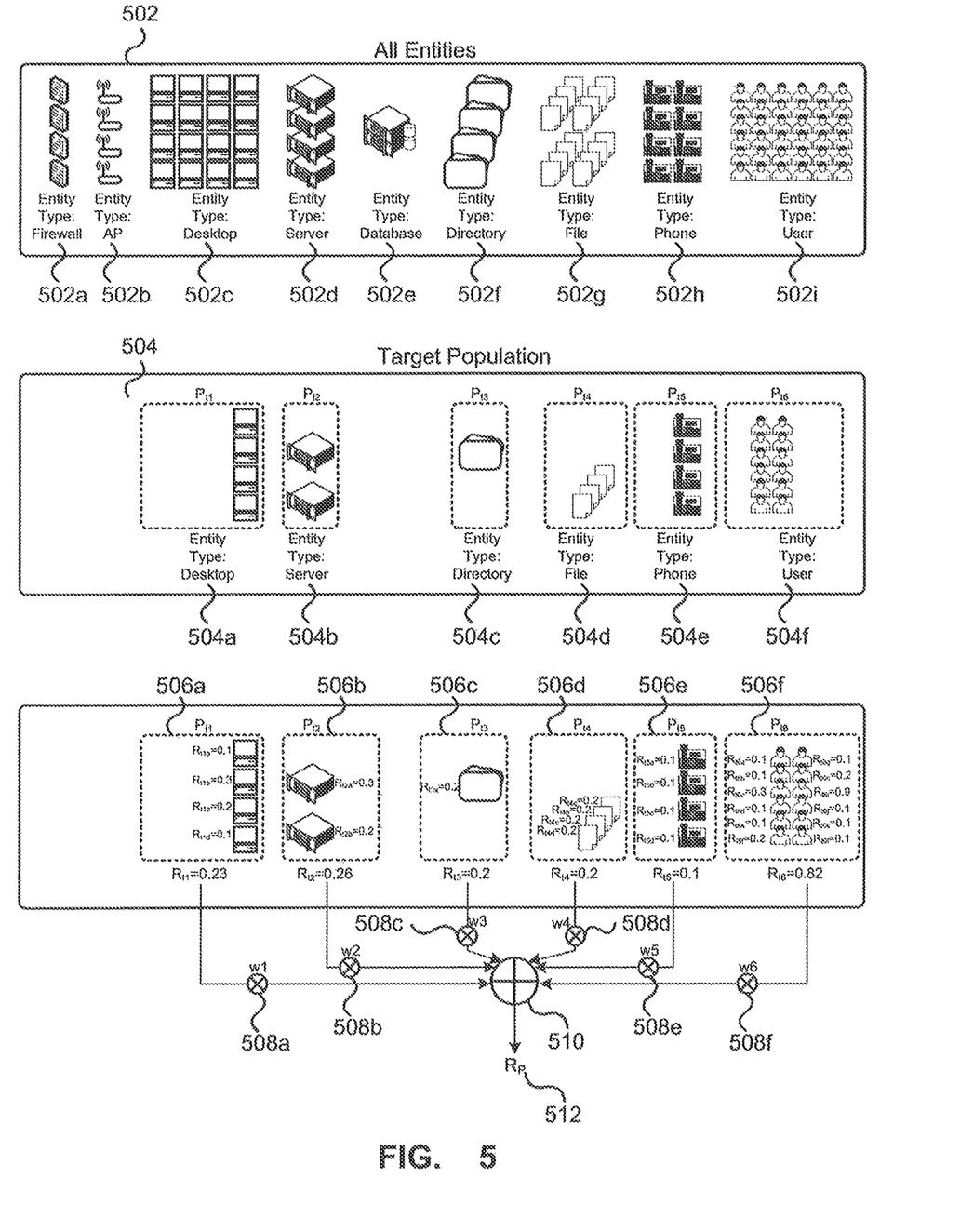
FIG. 5 depicts schematically the process of determining a risk score for an ad-hoc population of entities.

FIG. 5 depicts schematically the process of determining a risk score for an ad-hoc population of entities. As depicted, an organization may have a number of individual entities 502 within different categories. For example, the entity categories may include firewalls 502a, access points 502b, computers 502c, servers 502d, databases 502e, directories 502f, files 502g, phones 502h and user accounts 502i. From all of the entities, a target population 504 is selected. The target population may comprise all of the entities, a single entity or any combination of entities. As depicted in FIG. 5, the target population comprises a number of computers 504a, servers 504b, a directory 504c, a number of files 504d, phones 504e and user accounts 504f. Accordingly, the target population 504 comprises six different category types with subpopulations of respective entities Pt1, Pt2 Pt3, Pt4, Pt5, Pt6.

For each subpopulation an aggregate category risk score 506a-506f is determined. In order to determine each category risk score, the risk scores of each entity within the particular subpopulation is determined and then weighted and combined. For example, the category risk score for the computer subpopulation is determined from a weighting and normalization of the entity risk scores $Rt1a=0.1$, $Rt1b=0.3$, $Rt1c=0.2$ and $Rt1d=0.1$ which may be determined for each entity in the subpopulation based on aggregate risk statistics for the respective entity. Although an entity risk score may be determined from a single aggregate statistic for each entity, it is possible for each entity to be associated with a number of different aggregate statistics, for example one may be an indication of a potential lateral movement threat, and another may be an indication of a potential compromised account threat. Regardless of the number of different aggregate statistics computed for each entity, they are weighted and combined into a single category risk score using for example a root mean score or other averaging technique. When combining the different entity risk scores together to a category score specific entities may have additional weightings to increase or decrease the relative importance of that individual entity.

The risk scores for the individual categories are weighted by respective weights 508a-508b. The individual weightings allow different weightings to be applied to the different category types to allow the security threat posed by each category to be leveled relative to each other. That is, the individual category risk scores may provide an indication of how risky the category population is relative to other category populations of the same type (i.e. it may provide an indication that population A of phones is riskier than population B of phones). However the category risk scores may not be meaningful if compared across categories. That is a population of phones having the same risk score as a population of user accounts does not mean that the phones pose an equal threat since user accounts are typical a larger security threat than phones. The weighting of the categories allows the combination of different categories into a single risk score. The weighted category risk scores are combined and normalized based on the number of categories in the population 510 and the aggregate risk score output 512.

The population risk aggregation may use the linear sum of the normalized per-entity risk scores, dividing by the number of entity types which is known from the population definition, to result in a weighted mean, and then sending the weighted mean to a nonlinear function such as a Pareto function. The Pareto function allows flexible and potential real-time tuning of the overall population risk score response curve if required by a specific customer. The default Pareto shape parameters may be set to the identity function.

Figure 6:
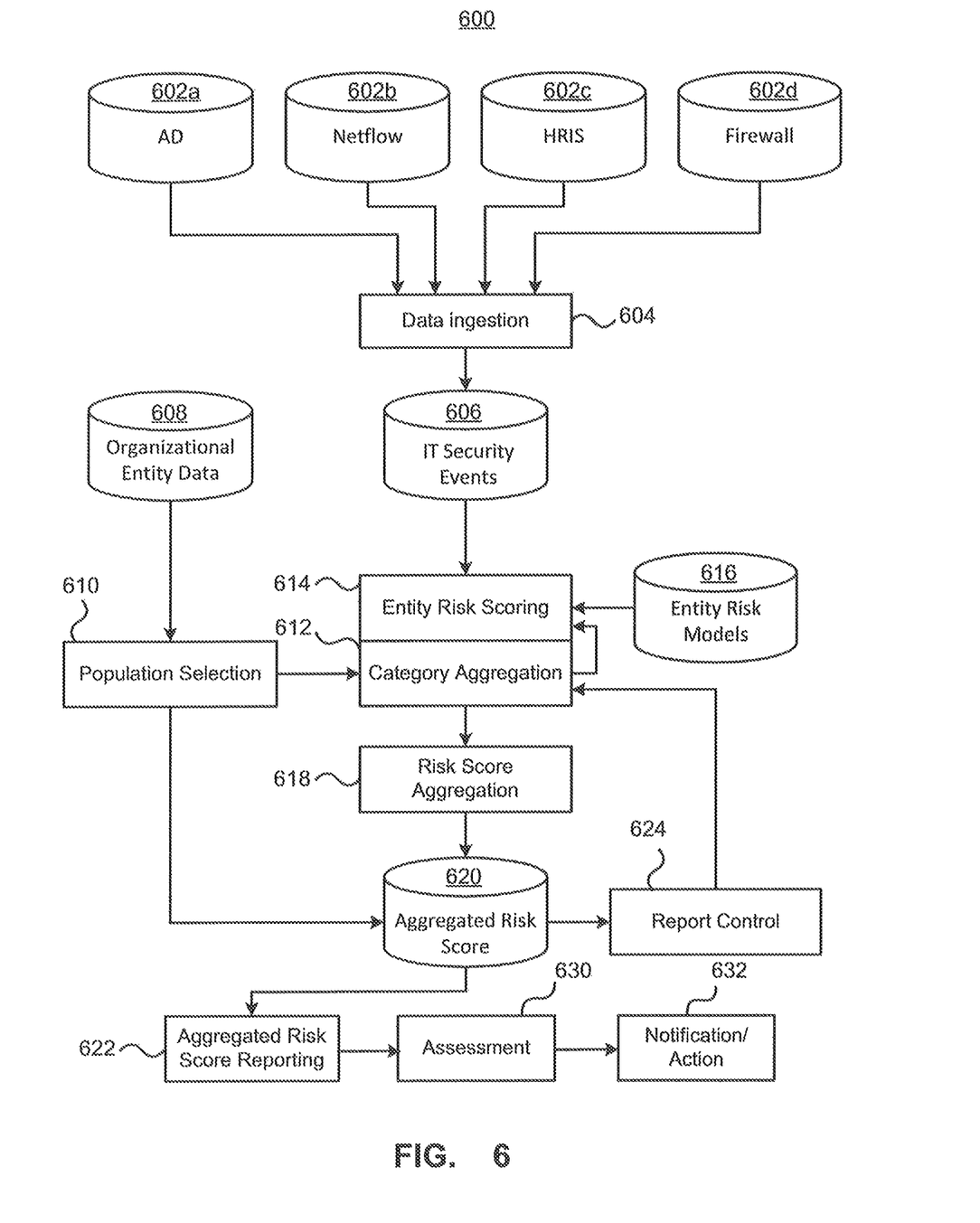
FIG. 6 depicts components of a system for determining risk scores for ad-hoc population of entities.

FIG. 6 depicts components of a system for determining risk scores for ad-hoc population of entities. The system 600 may be implemented by hardware computing devices across an organization's network and third parties' computing hardware, such as the one or more servers 150 of FIG. 1. The system includes one or more sources of security related data. These data sources are depicted as an Active Directory (AD) dataset 602a, a NetFlow dataset 602b, a Human Resources Information Systems (HRIS) dataset 602c and firewall dataset 602d (referred to security datasets 602 collectively). The particular security datasets 602 may be generated from various computing devices. The system 600 may use one or more of the security datasets or may include additional or alternative security datasets. The security datasets 602 are ingested by a data ingestion component 604 that receives the information from the security datasets 602 and generates IT security events 606. Each security event may include an indication of the entity associated with the event, a time the event occurred, a user or device identifier and metadata describing the event. For example an event may provide an indication of a time a particular user account successfully logged on to a particular system, network traffic transiting the network, document access, code repository access, data repository access, database access, etc.

The system 600 may also include organizational entity data 608 that can provide an association between organizational entities and its characteristics. For example, for a user account, it may include information such as employee information, security levels, employment location, department, etc. For a computer, it may include information such as its location, a user assigned to it, etc.

The system 600 includes a population selection component 610 that can allow a target population to be selected from all of the entities in an organization. The population selection component 610 may allow the entities to be selected in various ways for example using filtering of entity characteristics (i.e. all entities in a particular location, all entities associated with a particular department, etc.) as well as allowing ad-hoc selection of individual entities or groups of entities. The selected target population may be provided to a category aggregation component 612 that determines the category risk scores for the target population. The category aggregation component 612 may use an entity risk scoring component 614 in order to determine the risk scores of each individual entity in a category, which are then aggregated into the category risk score. The entity risk scoring component 614 may use one or more entity risk models 616 for determining the one or more risk scores for entities. The risk models to apply may be based on the particular category of an entity, with all entities of the same category having the same risk models applied. The category aggregation component 612 provides the determined aggregate category risk scores to a risk score aggregation component 618 that weights, combines and normalizes the category risk scores into a single aggregate risk score which may be store in a data store 620.

An aggregated risk score reporting component 622 may allow interactive visualizations of aggregated risk scores and actions to be performed. An assessment component 630 has thresholds defined for populations or entities to determine acceptable risk value and initiate an action to be performed by notification/action component 632. The assessment component may combine thresholds from individual entities or entity types to generate a threshold for the particular population risk score. The visualizations may allow the risk score of a population to be viewed over time in order to identify trends or results of changes to security policies. Further, the visualizations may provide an indication of the different threat types contributing to a risk score. A report control component 624 may be used to periodically update risk scores of selected populations in order to track the risk scores across time.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more components or modules to perform the steps corresponding to one or more methods, for example, has generation, transmitting, processing, and/or receiving steps. Thus, in some embodiments various features are implemented using components or modules. Such components or modules may be implemented using software, hardware or a combination of software and hardware. In some embodiments each component or module is implemented as an individual circuit with the device or system including a separate circuit for implementing the function corresponding to each described component or module. Many of the above described methods or method steps can be implemented using machine executable instructions, such as software, included in a machine readable medium such as a memory device, e.g., RAM, CD, DVD, flash memory, disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable non-transitory medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A system for identifying possible cybersecurity threats to an organization, the system comprising:
an electronic data store that stores, for each of a plurality of organizational entities, a plurality of information technology (IT) security events generated within a corresponding organizational entity, wherein the plurality of organizational entities comprise organizational entities of different entity types, wherein the IT security events comprise different types of information for the different entity types, wherein each IT security event comprises an event time, one or more entities, and metadata describing the respective IT security event, and wherein the different entity types comprise a plurality of users, computers, servers, printers, access points, phones, and firewalls;
a population selection component, in communication with the electronic data store, that specifies a target risk population of a subset of organizational entities from the plurality of organizational entities;
a category risk score component, in communication with the population selection component and electronic data store that generates a plurality of category risk scores, each of the category risk scores providing a risk score for each category of organizational entities in the target risk population and being generated using an IT security event associated with the corresponding organizational entity in the target risk population, by:
generating individual risk scores for each individual organizational entity of the target risk population; and
generating a plurality of entity-category risk scores by combining individual risk scores for organizational entities having a same entity type;
a population risk score component, in communication with the category risk score component, that generates a population risk score for the target risk population by combining the plurality of entity-category risk scores; and
an assessment component, in communication with the population risk score component, that determines when the population risk score or rate of change of the population risk score exceeds a threshold value.

2. The system of claim 1, wherein the assessment component compares a risk contribution of different threat types to the population risk score, wherein the subset of organizational entities from the plurality of organizational entities comprises organizational entities of different entity types, wherein the different threat types comprise a plurality of lateral movement, compromised account, suspicious activity, data staging, and data exfiltration, wherein different entity risk models are used by the category risk score component to determine a respective category risk score for each category and/or entity type, wherein different entity risk models are used by the category risk score component to determine a respective category risk score for each category and/or entity type, and wherein the assessment component generates a notification to identify that the threshold value for the population risk score or rate of change for the population risk score has been exceeded.

3. The system of claim 2, wherein the notification is a Short Message Service ("SMS") or email message, wherein the IT security events comprise an identifier associated with the corresponding organizational entity and one or more of user account activity, device information, and network data, wherein the category risk score component further generates individual risk scores for each individual organizational entity of a different second target risk population; and generates entity-category risk scores by combining individual risk scores for organizational entities in the second target risk population having a same entity type, wherein the population risk score component generates a second population risk score for the second target risk population by combining the plurality of entity-category risk scores for the organizational entities in the second target risk population, wherein the assessment component determines when the second population risk score or rate of change of the second population risk score exceeds the threshold value, and wherein a size of the target risk population is different from a size of the second target risk population, wherein an entity type of an organizational entity in the target population is different from the entity types of the organizational entities in the second target risk population, and wherein the assessment component compares the population risk score against the second population risk score.

4. The system of claim 2, wherein the category risk score for each category of organizational entities in the target risk population indicates how risky the corresponding category of the organizational entities in the target risk population is relative to a category of organizational entities in a second target risk population, the category corresponding to a common entity type, and wherein the notification generates an action at a data loss prevention (OLP) system or other security system to disable one or more associated accounts or computing devices in the target risk population.

5. The system of claim 2, wherein a selected category of organizational entities in the target risk population corresponds to a common entity type, wherein the notification generates an action to install software on one or more computing devices associated with the target risk population to monitor activity on the one or more computing devices.

6. The system of claim 1, wherein the population risk score is divided by a number of entity types in the target risk population to provide a weighted mean, and wherein the weighted mean is provided as an input to a nonlinear function to yield a real-time tuning of an overall population risk score response curve and further comprising:
 a plurality of computing devices associated with the organization, each of the computing devices capable of capturing data associated with the plurality of IT security events.

7. The system of claim 1, wherein generating the individual risk scores for each individual organizational entity of the target risk population comprises:
 determining one or more aggregate statistics for each individual organizational entity; and
 weighting, combining and normalizing the one or more aggregate statistics for each individual organizational entity of the target risk population to provide the corresponding individual risk score.

8. The system of claim 7, wherein the weighting, combining and normalizing of the one or more aggregate statistics are into a single entity category risk score.

9. The system of claim 8, wherein combining and normalizing the one or more aggregate statistics uses a root mean square (RMS) or a non-linear function of the one or more aggregate statistics.

10. The system of claim 1, wherein generating entity-category risk scores by combining individual risk scores for organizational entities having the same entity type comprises:
 weighting, combining and normalizing the individual risk scores to provide a single entity category risk score.

11. The system of claim 10, wherein the weighting of the individual risk scores provide a non-linear weighting.

12. The system of claim 11, wherein the weighting of one or more of the individual risk scores further includes an additional weighting specific to the individual organizational entity.

13. The system of claim 12, wherein combining and normalizing the individual risk scores uses a root mean square of the weighted individual risk scores.

14. The system of claim 1, wherein generating the population risk score for the target risk population by combining the plurality of entity category risk scores comprises: weighting, combining and normalizing individual entity category risk scores to provide the population risk score.

15. The system of claim 14, wherein the weighting of the individual entity category risk scores provides a non-linear weighting with a greater weighting for high entity category risk scores.

16. The system of claim 15, wherein combining and normalizing the individual entity-category risk scores uses a root mean square (RMS) or non-linear function of the weighted individual entity category risk scores.

17. A method of identifying possible cybersecurity threats to an organization, the method comprising:
 receiving, for each of a plurality of organizational entities, a plurality of information technology (IT) security events generated within a respective organizational entity, wherein each IT security event comprises an event time, one or more entities, and metadata describing the respective IT security event;
 selecting, by a processor, a target risk population of a subset of organizational entities from the plurality of organizational entities;
 generating, by the processor, a plurality of category risk scores, each of the category risk scores providing a risk score for each category of organizational entities in the target risk population by:
  generating individual risk scores for each individual organizational entity of the target risk population; and
  generating a plurality of entity-category risk scores by combining individual risk scores for organizational entities having a same entity type;
 generating a population risk score for the target risk population by combining the plurality of entity-category risk scores; and
 determining when the population risk score or rate of change of the population risk score exceeds a threshold value and wherein one or more of the following is true:
 (a) generating the individual risk scores for each individual organizational entity of the target risk population comprises: determining one or more aggregate statistics for each individual organizational entity; and weighting, combining and normalizing the one or more aggregate statistics for each individual organizational entity to provide the individual risk score;
 (b) generating the plurality of entity-category risk scores by combining individual risk scores for organizational entities having the same entity type comprises: weighting, combining and normalizing the individual risk scores to provide a single entity category risk score;
 (c) generating the population risk score for the target risk population by combining the plurality of entity category risk scores comprises: weighting, combining and normalizing individual entity category risk scores to provide the population risk score; and
 (d) the plurality of organizational entities comprise organizational entities of different entity types, the IT security events comprise different types of information for the different organizational entity types, wherein the different organizational entity types comprise one or more of computers, printers, servers, access points, phones, and firewalls, each of the category risk scores is generated using an IT security event associated with a corresponding organizational entity in the target risk population and wherein the determining further comprises comparing a risk contribution of different threat types to the population risk score.

18. The method of claim 17, wherein the plurality of organizational entities comprises organizational entities of different entity types, wherein the subset of organizational entities comprises organizational entities of different entity types, wherein the IT security events comprise different types of information for the different entity types, wherein a category risk score is generated using an IT security event associated with a corresponding organizational entity in the target risk population, wherein the different threat types comprise a plurality of lateral movement, compromised account, suspicious activity, data staging, and data exfiltration, and wherein different entity risk models are used by a category risk score component to determine a respective category risk score for each category and/or entity type, and further comprising comparing a risk contribution of different threat types to the population risk score; and generating a notification to identify that the threshold value for the population risk score or rate of change of the population risk score has been exceeded.

19. The method of claim 18, wherein the notification is a Short Message Service ("SMS") or email message, wherein the IT security events comprise an identifier associated with the corresponding organizational entity and one or more of user account activity, device information, and network data, and further comprising:
generating individual risk scores for each individual organizational entity of a different second target risk population;
generating entity-category risk scores by combining individual risk scores for organizational entities in the second target risk population having a same entity type;
generating a second population risk score for the second target risk population by combining the plurality of entity-category risk scores for individual organizational entities in the second target risk population; and
determining when the second population risk score or rate of change of the second population risk score exceeds the threshold value, wherein a size of the target risk population is different from a size of the second target risk population, and wherein an entity type of an organizational entity in the target population is different from the entity types of the organizational entities in the second target risk population.

20. The method of claim 18, wherein the category risk score indicates how risky a category of organizational entities of the target risk population is relative to a category of organizational entities of a second target risk population, the category corresponding to different entity types, and wherein the notification generates an action at a data loss prevention (OLP) or other security system to disable one or more associated accounts or computing devices in the target risk population.

21. The method of claim 18, wherein a selected category of organizational entities in the target risk population corresponds to a common entity type, wherein the notification generates an action to install software on one or more computing devices associated with the target risk population to monitor activity on the one or more computing devices, and wherein the population risk score is divided by a number of entity types in the target risk population to provide a weighted mean, and wherein the weighted mean is provided as an input to a nonlinear function to yield a real-time tuning of an overall population risk score response curve.

22. The method of claim 17, wherein (a) is true, wherein the weighting, combining and normalizing of the one or more aggregate statistics are into a single entity category risk score, and wherein combining and normalizing the one or more aggregate statistics uses a root mean square (RMS) or a non-linear function of the one or more aggregate statistics.

23. The method of claim 17, wherein (b) is true, wherein the weighting of the individual risk scores provides a non-linear weighting, wherein combining and normalizing the individual risk scores uses a root mean square of the weighted individual risk scores, and wherein the weighting of individual risk scores further includes an additional weighting specific to the individual organizational entity.

24. The method of claim 17, wherein (c) is true.

25. The method of claim 24, wherein the weighting of the individual entity category risk scores provide a non-linear weighting with a greater weighting for high entity category risk scores and wherein combining and normalizing the individual entity category risk scores uses a root mean square (RMS) or non-linear function of the weighted individual entity category risk scores.

26. The method of claim 17, wherein (d) is true.

27. A system for identifying possible cybersecurity threats to an organization, the system comprising:
an electronic data store that stores, for each of a plurality of organizational entities, a plurality of information technology (IT) security events generated within a corresponding organizational entity, wherein each IT security event comprises an event time, one or more entities, and metadata describing the respective IT security event;
a population selection component, in communication with the electronic data store, that specifies a target risk population of a subset of organizational entities from the plurality of organizational entities;
a category risk score component, in communication with the population selection component and electronic data store, that generates a plurality of category risk scores, each of the plurality of category risk scores providing a risk score for each category of organizational entities in the target risk population, by:
generating individual risk scores for each individual organizational entity of the target risk population; and
generating entity-category risk scores by combining individual risk scores for organizational entities having a same entity type;
a population risk score component, in communication with the category risk score component, that generates a population risk score for the target risk population by combining a plurality of entity-category risk scores; and
an assessment component, in communication with the population risk score component, that determines when the population risk score or rate of change of the population risk score exceeds a threshold value, and wherein one or more of the following is true:
(a) generating the individual risk scores for each individual organizational entity of the target risk population comprises: determining one or more aggregate statistics for each individual organizational entity; and weighting, combining and normalizing the one or more aggregate statistics for each individual organizational entity to provide the individual risk score;
(b) generating entity-category risk scores by combining individual risk scores for organizational entities having the same entity type comprises: weighting, combining and normalizing the individual risk scores to provide a single entity category risk score;
(c) generating the population risk score for the target risk population by combining the plurality of entity category risk scores comprises: weighting, combining and normalizing individual entity category risk scores to provide the population risk score; and (d) the plurality of organizational entities comprise organizational entities of different entity types, the IT security events comprise different types of information for the different entity types, wherein the different entity types comprise one or more of computers, printers, servers, access points, phones, and firewalls, each of the category risk scores is generated using an IT security event associated with the corresponding organizational entity in the target risk population, and the assessment component compares a risk contribution of different threat types to the population risk score.

28. The system of claim 27, wherein (a) is true, wherein the weighting, combining and normalizing of the one or more aggregate statistics are into a single entity category risk score, and wherein combining and normalizing the one or more aggregate statistics uses a root mean square (RMS) or a non-linear function of the one or more aggregate statistics.

29. The system of claim 27, wherein (b) is true, wherein the weighting of the individual risk scores provide a non-linear weighting, wherein the weighting of individual risk scores further includes an additional weighting specific to the individual organizational entity, and wherein combining and normalizing the individual risk scores uses a root mean square of the weighted individual risk scores.

30. The system of claim 27, wherein (c) is true, wherein the weighting of the individual entity category risk scores provide a non-linear weighting with a greater weighting for high entity category risk scores, and wherein combining and normalizing the individual entity category risk scores uses a root mean square (RMS) or non-linear function of the weighted individual entity category risk scores.

31. The system of claim 27, wherein (d) is true.

* * * * *